United States Patent
Isomura et al.

(10) Patent No.: US 9,409,551 B2
(45) Date of Patent: Aug. 9, 2016

(54) PARKING LOCK DEVICE (71) Applicants: Haruo Isomura, Toyota (JP); Hiroshi Takekawa, Toyota (JP)

(72) Inventors: Haruo Isomura, Toyota (JP); Hiroshi Takekawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/181,853

(22) Filed: Feb. 17, 2014

(65) Prior Publication Data

US 2014/0231213 A1 Aug. 21, 2014

(30) Foreign Application Priority Data

Feb. 18, 2013 (JP) ................. 2013-029238

(51) Int. Cl.
*F16H 63/34* (2006.01)
*B60T 1/00* (2006.01)
*F16D 63/00* (2006.01)
*F16D 125/66* (2012.01)

(52) U.S. Cl.
CPC ............... *B60T 1/005* (2013.01); *F16D 63/006* (2013.01); *F16H 63/3425* (2013.01); *F16D 2125/66* (2013.01)

(58) Field of Classification Search
CPC .......................... F16H 63/3416; F16H 63/3425
See application file for complete search history.

(56) References Cited

U.S. PATENT DOCUMENTS

2007/0062779 A1\* 3/2007 Kusamoto et al. ......... 192/219.5

FOREIGN PATENT DOCUMENTS

| EP | 1717490 A2 | 11/2006 |
| JP | 03124068 U | 12/1991 |
| JP | 2006-131109 A | 5/2006 |
| JP | 2006131109 A \* | 5/2006 |
| JP | 2006-308018 A | 11/2006 |
| JP | 2009-208568 A | 9/2009 |
| JP | 2009208568 A \* | 9/2009 |

\* cited by examiner

Primary Examiner — Huan Le
(74) Attorney, Agent, or Firm — Dinsmore & Shohl LLP (57) ABSTRACT A parking lock device that is installed in a transmission of a vehicle includes a gear, a lock, a receiver, a cam, and a damper. The lock has a pawl that can be engaged in a tooth space between the teeth of the gear. The lock moves between an engagement position at which the pawl is engaged in the tooth space to lock the gear and a retreat position at which the pawl is not engaged in the tooth space. The receiver is arranged to be fixed to a case of the transmission. The cam moves forward and backward with respect to a gap between the receiver and the lock. The cam holds the lock at the engagement position when having entered the gap. The damper is provided in a vibration transmission path to dampen vibrations transmitted to the case of the transmission.

14 Claims, 5 Drawing Sheets

PARKING LOCK DEVICE

INCORPORATION BY REFERENCE

The disclosure of Japanese Patent Application No. 2013-029238 filed on Feb. 18, 2013 including the specification, drawings and abstract is incorporated herein by reference in its entirety.

BACKGROUND OF THE INVENTION

1. Field of the Invention

The invention relates to a parking lock device that locks a shaft connecting to wheels to prevent a vehicle from moving when the vehicle is parked.

2. Description of Related Art

A parking lock device of a vehicle has a gear that is fixed to a shaft connecting to wheels, and a lock that is engaged in a tooth space of the gear to lock the gear. It should be noted herein that the shaft connecting to the wheels means a shaft that rotates while establishing a relationship of being constantly fixed to the wheels. The gear is locked to lock the wheels, thereby preventing the vehicle from moving when the vehicle is parked.

The parking lock device is provided in a transmission of the vehicle. The transmission is a device that has a function of converting rotational speeds and torques of outputs of prime movers such as an internal combustion engine, an electric motor and the like, which are mounted on the vehicle, and delivering the outputs to the wheels. There is also known a device that is equipped with a differential for permitting a difference in rotational speed between right and left driving wheels as well as a shifting mechanism that carries out speed conversion and torque conversion. Examples of the transmission include, for example, a manual multistage transmission, an automatic multistage transmission, and a continuously variable transmission. Besides, there is also known a transmission for a hybrid vehicle that also incorporates an electric motor for driving the vehicle in addition to a shifting mechanism.

An example of the configuration of a parking lock device of a vehicle is disclosed in Japanese Patent Application Publication No. 2006-131109 (JP-2006-131109 A).

SUMMARY OF THE INVENTION

There is a backlash between the gear and the lock. If the gear undergoes rotational fluctuation, the gear and the lock move relatively to each other within a range of the backlash and come into contact with each other. An impact caused at the time of the contact is transmitted to a case of the transmission, and radiated to the outside as noise.

The invention provides a parking lock device that prevents noise from being produced due to a contact between a gear and a lock.

An aspect of the invention relates to a parking lock device that is installed in a case of a transmission of a vehicle. The parking lock device includes a gear, a lock, a receiver, a cam, and a damper. The gear includes a plurality of teeth arranged in a circumferential direction of the gear. A tooth space is defined between the plurality of teeth. The lock includes a pawl to be engaged in the tooth space. The lock is moveable between an engagement position and a retreat position. In the engagement position, the pawl is engaged in the tooth space to lock the gear. In the retreat position, the pawl is not engaged in the tooth space. The receiver is fixed to the case of the transmission. The cam is moveable into and out of a gap defined between the receiver and the lock. The cam holds the lock in the engagement position when having entered into the gap. The damper dampens vibrations that are generated when the gear and the lock come into contact with each other. The damper is provided on a vibration transmission path that transmits the generated vibrations to the case of the transmission. The vibration transmission path is formed of the lock, the cam, and the receiver.

The parking lock device according to the invention includes the gear, the lock that can lock the gear, and the cam that controls the movements of the lock. The gear has the plurality of the teeth arranged in the circumferential direction thereof. The lock has the pawl that can be engaged in the tooth space between the teeth of the gear, and can move between the engagement position at which the pawl is engaged in the tooth space and the retreat position at which the pawl is not engaged in the tooth space. The cam controls the movements of the lock, and holds the lock at the engagement position. Specifically, the cam can move forward and backward with respect to the gap between the receiver, which is arranged at a position fixed to the case of the transmission, and the lock. By entering this gap, the cam moves the lock to the engagement position to hold it at this position. When the cam retreats from the gap between the receiver and the lock, the lock is allowed to move to the retreat position. Alternatively, when the cam retreats from the gap between the receiver and the lock, the cam may retreat the lock to the retreat position. Vibrations resulting from a contact between the gear and the lock are transmitted to the case of the transmission via the lock, the cam, and the receiver. The vibrations transmitted to the case are transmitted through the case, and reach, for example, an outer wall that partitions the inside and outside of the transmission from each other, so that noise is radiated therefrom. The damper that damps the vibrations transmitted through this vibration transmission path is provided on this path.

By providing the damper on the aforementioned vibration transmission path, noise radiated from a surface of the case of the transmission as a result of a contact between the gear and the lock can be abated.

In the aforementioned parking lock device, the damper may be provided on the receiver. The receiver can be a component separate from the case of the transmission.

In the aforementioned parking lock device, the damper may be a weight. The weight functions as a mass damper that damps vibrations in a region in which the weight is provided, depending on the mass of the weight. Besides, the weight can be directly provided on a member that constitutes the aforementioned vibration transmission path, or can also be provided via an arm that extends away from the member that constitutes the transmission path. The weight can be provided on the receiver. The weight can also be formed integrally with the receiver, or can also be configured separately from the receiver and then fixed thereto.

In the aforementioned parking lock device, the damper may be a dynamic damper. The dynamic damper includes a mass, and an elastic that is interposed between the mass and the receiver. The dynamic damper suppresses the transmission of vibrations in the vicinity of a natural frequency that is determined by the mass and the elastic. The dynamic damper can be provided on the receiver. The dynamic damper can also be formed integrally with the receiver, or can also be configured separately from the receiver and then fixed thereto.

In the aforementioned parking lock device, the receiver may be a component separate from the case of the transmission, and the damper may be an elastic member disposed between the case of the transmission and the receiver. Rubber can be employed as the elastic member.

In the aforementioned parking lock device, the gear may be provided on a shaft that is constantly connected to an output shaft of an internal combustion engine that is mounted on the vehicle. Noise that is produced when the gear vibrates upon receiving rotational fluctuation of the output shaft of the internal combustion engine can be suppressed.

Noise that is radiated when a lock and a gear of a parking lock mechanism come into contact with each other can be suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
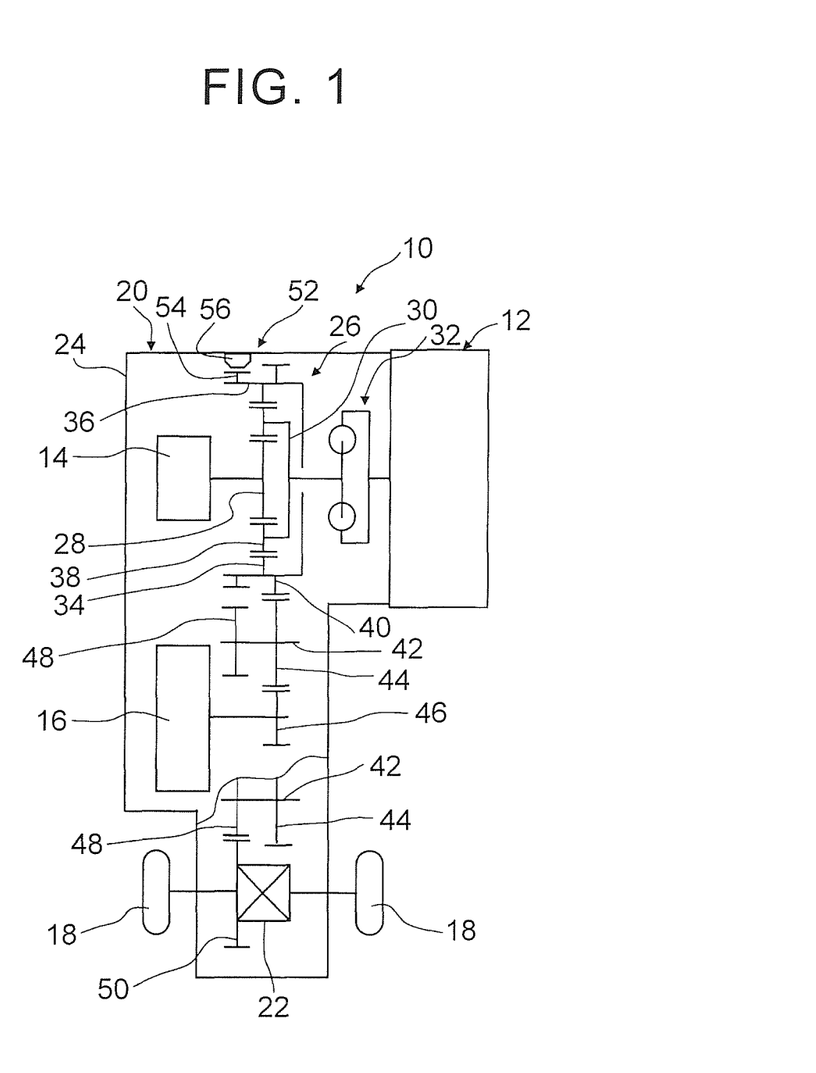
FIG. 1 is a view showing the overall configuration of a power unit according to the invention.

The embodiments of the invention will be described hereinafter with reference to the drawings. FIG. 1 is a skeleton view showing the overall configuration of a power unit 10 of a vehicle according to the present embodiments of the invention. The power unit 10 has an internal combustion engine 12 and two electric motors 14 and 16 as prime movers that drive the vehicle. The internal combustion engine 12 can be configured as a reciprocating piston engine such as an Otto engine, a diesel engine or the like. The two electric motors will be referred to as the first electric motor 14 and the second electric motor 16. The two electric motors function as electric generators as well. For example, the first electric motor 14 can generate electricity by being driven by the internal combustion engine 12. The second electric motor 16 can generate electricity by being driven by the inertia of the vehicle.

The power unit 10 has a transmission 20 that converts speeds of outputs of the prime movers 12, 14 and 16 and delivers the outputs to driving wheels 18. The transmission 20 includes a differential 22 for permitting a difference in speed between the right and left driving wheels 18. This transmission 20 is sometimes referred to as a transaxle. Furthermore, the first electric motor 14 and the second electric motor 16 are built in the transmission 20. The transmission 20 is configured with movable structures such as gears, shafts and the like accommodated in a transmission case 24. The transmission case 24 includes an outer wall that partitions the inside and outside of the transmission 20 from each other, and a region that supports the respective accommodated movable structures. The outer wall, the region that supports the movable structures, and a region that is fixedly provided thereon will be entirely regarded as the transmission case 24 in the following description.

The transmission 20 includes a planetary gear mechanism 26. An output shaft of the first electric motor 14 is connected to a sun gear 28 of the planetary gear mechanism 26, and an output shaft of the internal combustion engine 12 is connected to a planetary carrier 30 via a torsional damper. A ring gear 34 is provided on an output sleeve 36. The planetary carrier 30 rotatably supports a planetary pinion 38 that meshes with the sun gear 28 and the ring gear 34. The sun gear 28, the planetary carrier 30 and the ring gear 34 as three elements of the planetary gear mechanism 26 are related to one another such that if rotational speeds of any two of the elements are determined, a rotational speed of the other one element is automatically determined. A first output gear 40 is provided on the output sleeve 36, and the first output gear 40 meshes with a counter driven gear 44 on a countershaft 42. The counter driven gear 44 in turn meshes with a second output gear 46 that is linked with an output shaft of the second electric motor 16. A final drive gear 48 is provided on the countershaft 42, and this final drive gear 48 meshes with a final driven gear 50 that is fixed to a differential case of the differential 22. A well-known differential can be adopted as the differential 22, and the description thereof is omitted herein.

A parking lock device 52 of this transmission 20 is provided on the output sleeve 36 and that region of the transmission case 24 which faces the output sleeve 36. A parking gear 54 is provided on an outer peripheral face of the output sleeve 36, and a parking pawl 56 is provided on the transmission case 24 side in such a manner as to mesh with the parking gear 54. The details of the parking lock device 52 will be described later.

A power transmission path from the first output gear 40 to the driving wheels 18 is constituted of constantly meshed gear pairs and shafts. As a result, the driving wheels 18 and the first output gear 40 rotate while establishing a certain relationship corresponding to a gear ratio between the gears of the power transmission path. That is, if the first output gear 40 is stopped from rotating, the driving wheels 18 are also stopped from rotating. The parking gear 54 is provided on the output sleeve 36 together with the first output gear 40. Therefore, the driving wheels 18 can be locked by stopping the parking gear 54 from rotating.

Besides, the output sleeve 36 is provided with the ring gear 34 as well. The parking gear 54 is constantly connected to the output shaft of the internal combustion engine 12 via the ring gear 34, the planetary pinion 38, the planetary carrier 30, and a torsional damper 32. Thus, if the output shaft of the internal combustion engine 12 undergoes rotational fluctuation, this rotational fluctuation is transmitted to the parking gear 54. In particular, in this transmission 20, since the torsional damper 32 is provided on the output shaft of the internal combustion engine 12, the amplitude of rotational vibrations of the parking gear 54 may become large in the vicinity of a resonance frequency of a vibration system including this torsional damper 32. For example, in the case where the internal combustion engine 12 is a reciprocating piston engine, the output shaft of the internal combustion engine 12 undergoes rotational fluctuation due to reciprocating movements of a piston, intermittent combustion and the like. If the frequency of this rotational fluctuation becomes close to the aforementioned resonance frequency, the vibration system resonates. For example, the start of the internal combustion engine 12 may be accompanied by the passage of the resonance frequency of the aforementioned vibration system while the rotational speed of the internal combustion engine 12 rises. At this time, if the parking lock device 52 is locked, the parking gear 54 and the parking pawl 56 that meshes therewith may come into contact with each other to produce noise audible to passengers of the vehicle. The parking lock device 52 of this embodiment of the invention is structured such that no noise is produced when the parking gear 54 rotationally vibrates upon receiving rotational fluctuation of the internal combustion engine 12 or due to other causes. The parking lock device 52 will be described hereinafter.

Figure 2:
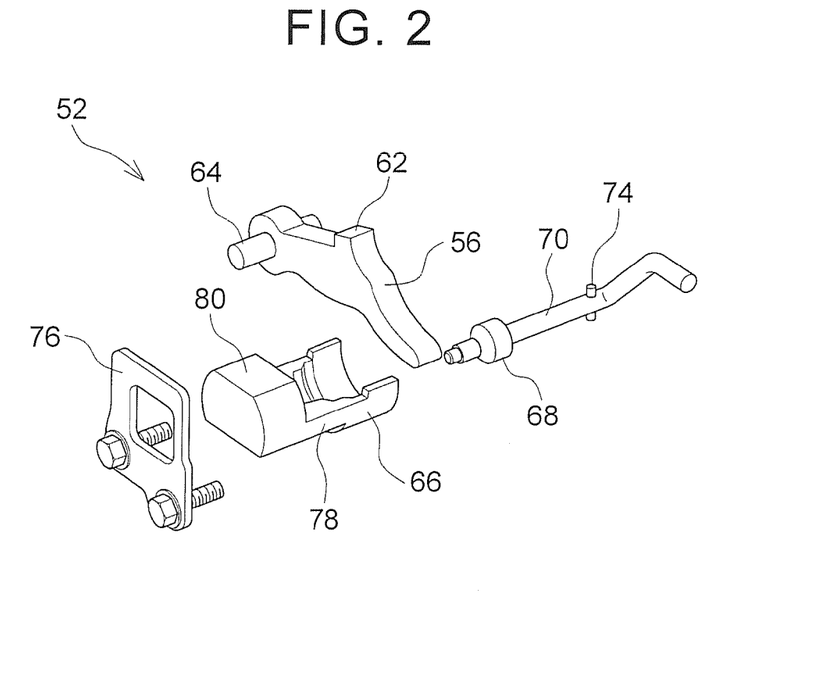
FIG. 2 is a perspective view showing the overall configuration of a parking lock device according to an embodiment of the invention.
Figure 3:
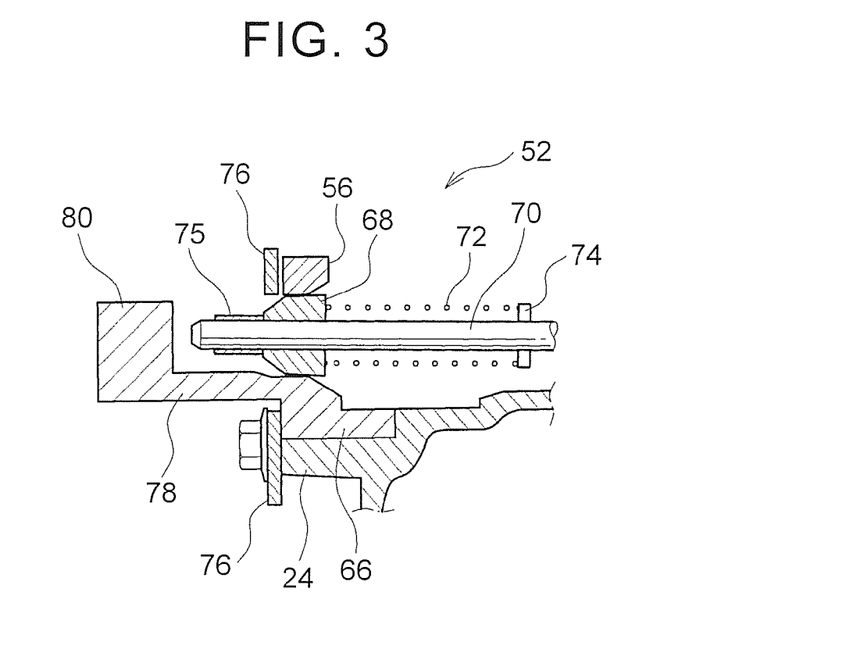
FIG. 3 is a lateral sectional view of the parking lock device shown in FIG. 2.
Figure 4:
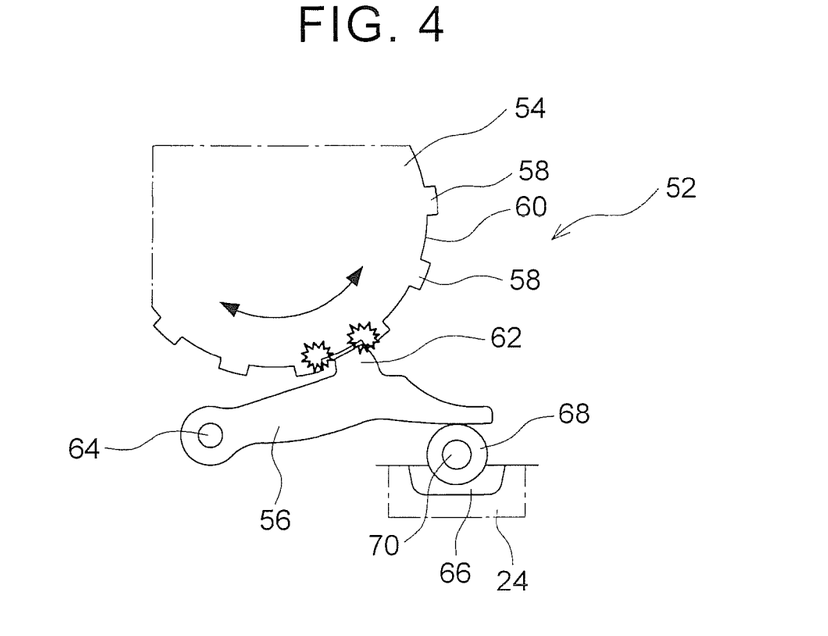
FIG. 4 is a front view of the parking lock device shown in FIG. 2.

FIGS. 2 to 4 are views showing the details of the parking lock device 52. The parking gear (the gear) 54 is constituted of a plurality of teeth 58 that are arranged on an outer periphery of the output sleeve 36 in a circumferential direction thereof. The parking pawl (a lock) 56 has a pawl 62 that can be engaged in tooth spaces 60 as regions among the teeth 58, and is turnably supported by a support shaft 64 that is fixed to the transmission case 24. The parking pawl 56 turns and thus can move between an engagement position at which the pawl 62 is engaged in a certain one of the tooth spaces 60 and a retreat position at which the pawl 62 has exited a certain one of the tooth spaces 60. Besides, the parking pawl 56 is urged in a direction toward the retreat position by urging means (not shown), for example, a spring.

A cam receiver (a receiver) 66 is fixed to the transmission case 24. A cam (a cam) 68 that can move into and out of a gap between this cam receiver 66 and the parking pawl 56 is arranged. A direction in which the cam 68 moves toward the gap between the cam receiver 66 and the parking pawl 56 will be referred to hereinafter as an advance direction, and a direction in which the cam 68 moves away from the gap between the cam receiver 66 and the parking pawl 56 will be referred to hereinafter as a retreat direction. The cam 68 is slidably arranged on a parking rod 70 that penetrates therethrough. The cam 68 assumes a substantially cylindrical shape, and is arranged coaxially with the parking rod 70 that penetrates an inner void of the cylinder. A tapered face is formed on a front face of the cam 68 in the advance direction. Besides, a tapered face or tapered faces are formed on one or both of the cam receiver 66 and the parking pawl 56 in such a manner as to face the tapered face of this cam 68. The parking rod 70 is provided with urging means for urging the cam 68 in the advance direction. The urging means is, for example, a spring 72, and is preferably a coiled spring. This spring 72 is located between a spring shoe 74 that is fixedly provided on the parking rod 70 and the cam 68, and urges the cam 68 in the advance direction. A stopper 75 that determines limit positions of the movements of the cam 68 in the advance direction is provided on the parking rod 70. In a free state, the cam 68 is moved to such a position as to hit the stopper 75 by the spring 72.

A presser plate 76 is fixed to an end face of the transmission case 24. The presser plate 76 prevents the cam receiver 66 from falling off from the transmission case 24, and supports the parking pawl 56 from laterally thereof. Due to this lateral support, when the parking pawl 56 receives a force through the advancement of the cam 68, this force prevents the parking pawl 56 from being greatly displaced.

It is preferable that the cam receiver 66 be formed of a material with high abrasion resistance such as steel, cast iron or the like, in consideration of abrasion resulting from the advancement and retreat of the cam 68. In particular, in the case where the transmission case 24 is made of a material that is relatively likely to abrade, such as aluminum alloy or the like, it is preferable that the cam receiver 66 be made of steel or the like as a component separate from the transmission case 24. In the case where the transmission case 24 is made of a material with excellent abrasion resistance or where abrasion causes no problem, the cam receiver 66 can also be configured as part of the transmission case 24 instead of a component separate from the transmission case 24.

Next, the operation of the parking lock device 52 will be described. During lock operation, the parking rod 70 is first moved in the advance direction. Due to this movement, the spring 72 is compressed, and the spring force applied to the cam 68 increases. When the pawl 62 of the parking pawl and a certain one of the tooth spaces 60 of the parking gear are in such a positional relationship as to face each other, the cam 68 urged by the spring 72 presses the parking pawl 56, and turns this parking pawl 56 toward the parking gear 54. As a result, the parking pawl 56 moves to the engagement position to mesh with the parking gear 54, so that the vehicle is locked. On the other hand, in the case where the pawl 62 of the parking pawl is located at such a position as to face a certain one of the teeth 58 of the parking gear, even if the cam 68 is urged by the spring 72, the parking pawl 56 is prevented from turning. If the vehicle slightly moves etc. from this state and the parking gear 54 rotates so that the pawl 62 of the parking pawl faces a certain one of the tooth spaces 60, the parking pawl 56 turns by being pressed by the cam 68. Thus, the parking pawl 56 moves to the engagement position to mesh with the parking gear 54, so that the vehicle is locked.

In order to unlock the vehicle, the parking rod 70 is moved in the retreat direction. Due to this movement, the stopper 75 is hooked on the cam 68, and the cam 68 moves in the retreat direction together with the parking rod 70 and exits from the gap between the parking pawl 56 and the cam receiver 66. The unsupported parking pawl 56 turns in such a direction as to move away from the parking gear 54 due to an urging force of urging means (not shown), and moves to the retreat position, so that the vehicle is unlocked.

If the parking gear 54 vibrates in a rotational direction as indicated by an arrow of FIG. 4 when the parking lock device 52 is locked, the parking gear 54 turns by an amount corresponding to a backlash, and the teeth 58 of the parking gear and the pawl 62 of the parking pawl repeatedly come into contact with each other. An impact of this contact is transmitted to the transmission case 24 via the parking pawl 56, the cam 68 and the cam receiver 66, and causes the transmission case 24 to vibrate.

Figure 5:
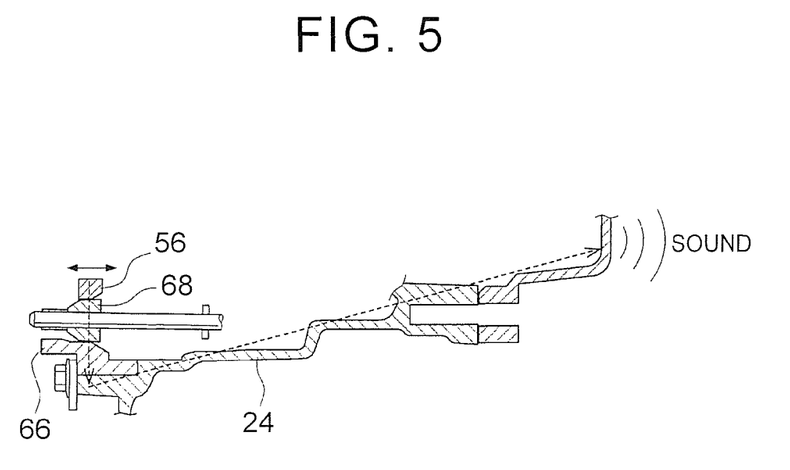
FIG. 5 is a view showing a transmission path of vibrations generated in the parking lock device.

FIG. 5 is a view showing the outline of a transmission path of vibrations resulting from a contact between the parking gear 54 and the parking pawl 56. If the parking pawl 56 vibrates as indicated by, for example, arrows of FIG. 5 due to the contact, these vibrations are transmitted to the transmission case 24 via the cam 68 and the cam receiver 66. The vibrations are further transmitted through the inside of the transmission case 24, and cause the outer wall and the like of the transmission case 24 to vibrate. These vibrations are radiated as noise. In order to suppress the transmission of these vibrations, the parking lock device 52 has a mass damper in the vibration transmission path. More specifically, the parking lock device 52 has an arm portion 78 that extends from the cam receiver 66, and a weight (a damper) 80 that is provided at an end of the arm portion 78. The arm portion 78 extends parallel to the direction in which the parking rod 70 extends, and the weight 80 is arranged at a tip position of a distal end of the parking rod 70. The weight 80, the arm portion 78, and the cam receiver 66 can be configured as an integral component. Besides, the weight 80 (or the weight 80 and the arm portion 78) may be configured as a component separate from the cam receiver 66, and fixed afterwards. The weight may also be provided in a region other than the cam receiver 66. Because of the mass of the weight 80, the vibrations are suppressed and restrained from being transmitted. That is, the weight 80 functions as a mass damper.

The weight, namely, the mass damper may be provided at any position on the vibration transmission path. However, it is more effective to provide the weight on the cam receiver 66 as an input point of vibrations to the transmission case 24, or in the vicinity thereof.

Figure 6:
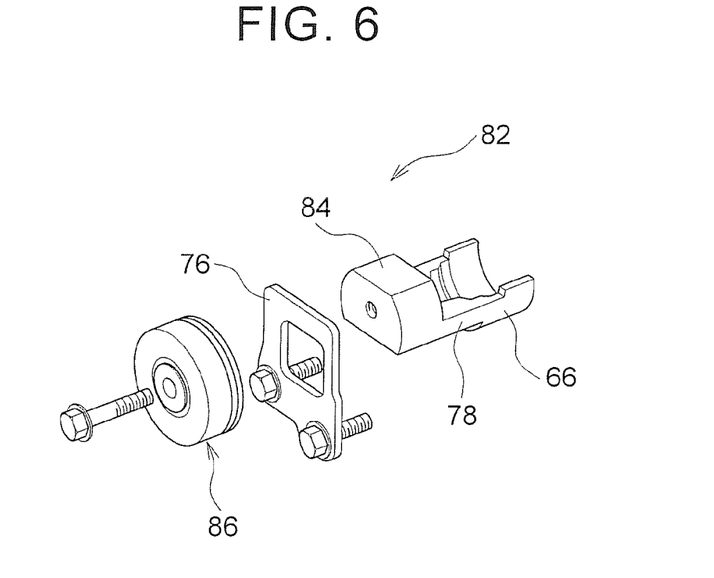
FIG. 6 is a perspective view showing an essential part of a parking lock device according to another embodiment of the invention.
Figure 7:
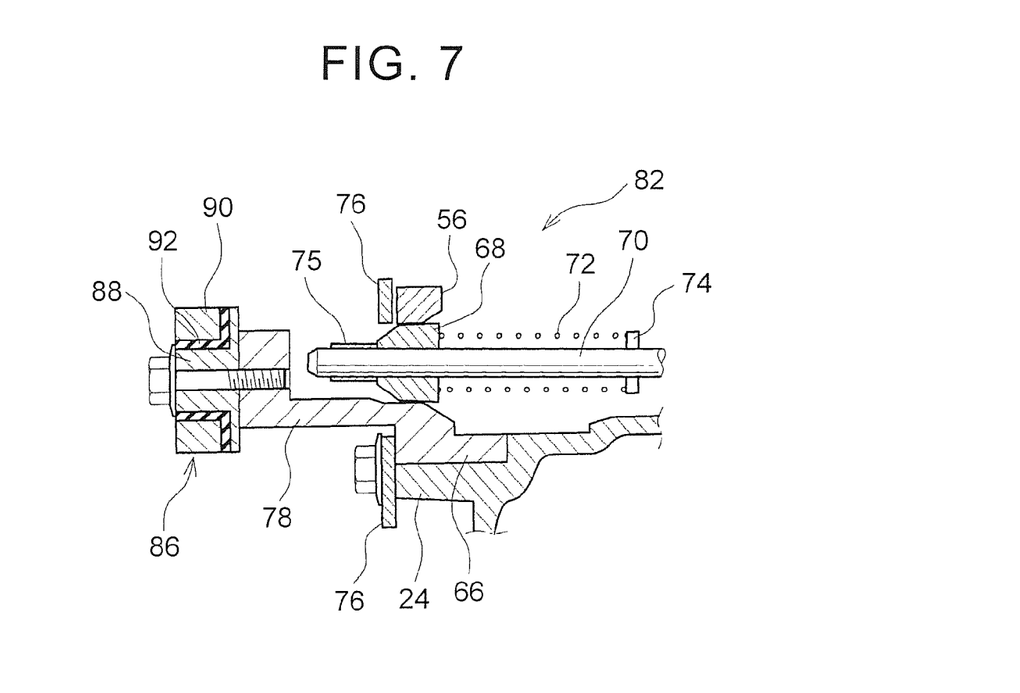
FIG. 7 is a lateral sectional view of the parking lock device shown in FIG. 6.

FIGS. 6 and 7 are views showing the overall configuration of a parking lock device 82. The parking lock device 82 is different from the aforementioned parking lock device 52 in the configuration for suppressing vibrations. While the mass damper is configured to suppress vibrations in the parking lock device 52, a dynamic damper is configured to suppress vibrations in the parking lock device 82. The parking lock device 82 is identical in other configurational details to the parking lock device 52. Components identical to those of the parking lock device 52 are omitted in the drawings or denoted by the same reference symbols respectively, and the description thereof will be skipped.

The parking lock device 82 has the arm portion 78 that extends from the cam receiver 66, and a damper receiving portion 84 that is provided at an end of the arm portion 78. The arm portion 78 extends parallel to the direction in which the parking rod 70 extends, and the damper receiving portion 84 is arranged at the tip of the distal end of the parking rod 70. The damper receiving portion 84, the arm portion 78, and the cam receiver 66 can be configured as an integral component. Besides, the damper receiving portion 84 (or the damper receiving portion 84 and the arm portion 78) may be configured as a component separate from the cam receiver 66, and fixed afterwards.

A damper portion (a damper) 86 is linked with the damper receiving portion 84. For example, the damper portion can be linked with the damper receiving portion 84 by securely screwing a bolt passed through a through-hole of the damper portion 86 into a threaded hole provided through the damper receiving portion 84. The damper portion 86 has a base portion 88 that has a flange provided at one end of a cylinder, and an annular weight portion 90 that surrounds the periphery of a cylindrical region of the base portion 88. An elastic layer 92 that is constituted by an elastic material such as rubber or the like is provided between the base portion 88 and the weight portion 90. The elastic layer 92 can be provided on one or both of a cylindrical outer peripheral face of the base portion 88 and a lateral face of the flange portion. The dynamic damper with the elastic layer 92 and the weight portion 90 serving as a spring and a mass respectively is formed. This dynamic damper can suppress the transmission of vibrations in the vicinity of a natural frequency that is determined by a spring constant of the elastic layer 92 and a mass of the weight portion 90. It is preferable that the natural frequency be adjusted to a frequency with remarkable transmission of vibrations, or to a frequency of noise radiated into a vehicle interior and audible to passengers. Besides, the masses of the damper receiving portion 84 and the damper portion 86 operate as weights. Therefore, a damping effect in a wide range can also be expected instead of an effect as a mass damper, namely, an effect in a limited frequency range.

The dynamic damper may be provided at any position on the vibration transmission path. However, it is more effective to provide the dynamic damper on the cam receiver 66 as an input point of vibrations to the transmission case 24 or in the vicinity thereof. Besides, the dynamic damper may be directly linked with the cam receiver 66 without providing the arm portion 78 and the damper receiving portion 84. Specifically, for example, a threaded hole can be provided through the cam receiver 66, and a bolt passed through a through-hole of the damper portion 86 can be securely screwed thereto.

Figure 8:
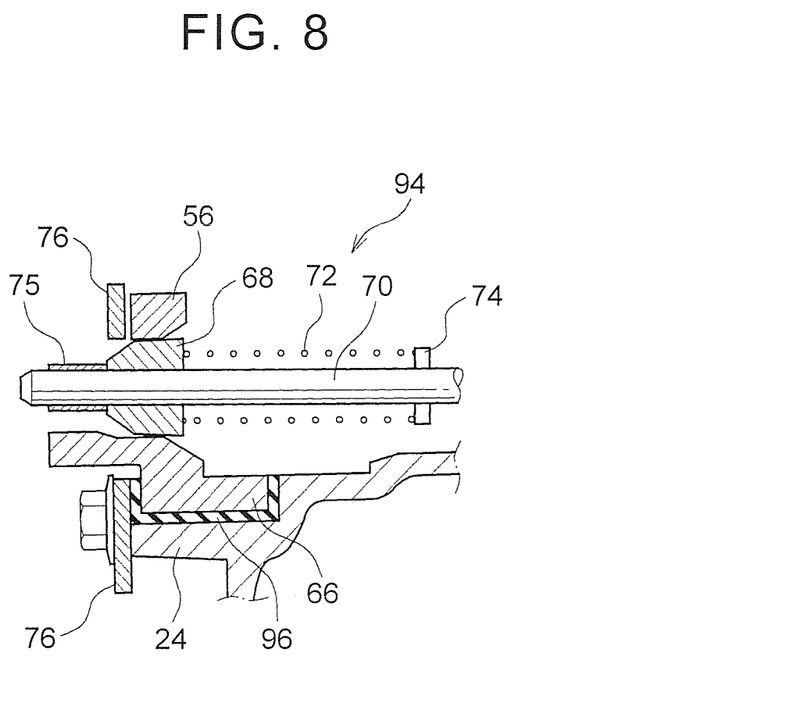
FIG. 8 is a lateral sectional view of still another parking lock device.

FIG. 8 is a view showing the overall configuration of a parking lock device 94. The parking lock device 94 is different from the aforementioned parking lock devices 52 and 82 in the configuration for suppressing vibrations. While the mass damper or the dynamic damper is configured to suppress vibrations in the aforementioned parking lock devices 52 and 82, the parking lock device 94 is a vibration isolating layer that is interposed in a vibration transmission path. The parking lock device 94 is identical in other configurational details to the parking lock device 52. Components identical to those of the parking lock device 52 are omitted in the drawings or denoted by the same reference symbols respectively, and the description thereof will be skipped.

In the parking lock device 94, the cam receiver 66 is fixed to the transmission case 24 via a vibration isolating layer (a damper) 96 that is made of an elastic member such as rubber or the like. In the case where the vibration isolating layer 96 is constituted by rubber, the rubber can be linked with the cam receiver 66 and the transmission case 24 through, for example, baking. Besides, the rubber can also be linked with the cam receiver 66 and the transmission case 24 using an adhesive. Even if the cam receiver 66 vibrates, these vibrations are damped by the vibration isolating layer 96 made of the elastic member and then transmitted to the transmission case 24. It is preferable that the vibration isolating layer 96 be provided in the vicinity of the cam receiver 66 at an input position of vibrations to the transmission case 24. Besides, the vibration isolating layer 96 can also be used in combination with the aforementioned mass damper or dynamic damper.

What is claimed is:

1. A parking lock device that is installed in a case of a transmission of a vehicle, the parking lock device comprising:
    a gear including a plurality of teeth arranged in a circumferential direction of the gear, a tooth space being defined between the plurality of teeth;
    a lock including a pawl to be engaged in the tooth space, the lock moveable between an engagement position and a retreat position, in the engagement position the pawl is engaged in the tooth space to lock the gear and in the retreat position the pawl is not engaged in the tooth space;
    a receiver fixed to the case of the transmission;
    a cam moveable into and out of a gap defined between the receiver and the lock, the cam holding the lock in the engagement position when having entered into the gap; and
    a damper provided on the receiver, the damper dampens vibrations that are generated when the gear and the lock come into contact with each other, the damper provided on a vibration transmission path that transmits the generated vibrations to the case of the transmission, the vibration transmission path formed of the lock, the cam, and the receiver,
    wherein the damper is a weight formed at an end of an arm portion that extends from the receiver.

2. The parking lock device according to claim 1, wherein the receiver is a component separate from the case of the transmission.

3. The parking lock device according to claim 1, wherein the gear is provided on a shaft that is constantly connected to an output shaft of an internal combustion engine that is mounted on the vehicle.

4. The parking lock device according to claim 1 further comprising:
a presser plate secured to the case of the transmission,
wherein the damper is secured to the case of the transmission through the presser plate.

5. The parking lock device according to claim 1 further comprising:
a presser plate secured to the case of the transmission,
wherein the receiver is fixed to the case of the transmission by the presser plate.

6. A parking lock device that is installed in a case of a transmission of a vehicle, the parking lock device comprising:
a gear including a plurality of teeth arranged in a circumferential direction of the gear, a tooth space being defined between the plurality of teeth;
a lock including a pawl to be engaged in the tooth space, the lock moveable between an engagement position and a retreat position, in the engagement position the pawl is engaged in the tooth space to lock the gear and in the retreat position the pawl is not engaged in the tooth space;
a receiver fixed to the case of the transmission;
a cam moveable into and out of a gap defined between the receiver and the lock, the cam holding the lock in the engagement position when having entered into the gap; and
a dynamic damper formed at an end of an arm portion that extends from the receiver, the dynamic damper dampens vibrations that are generated when the gear and the lock come into contact with each other, the dynamic damper provided on a vibration transmission path that transmits the generated vibrations to the case of the transmission, the vibration transmission path formed of the lock, the cam, and the receiver.

7. The parking lock device according to claim 6 further comprising:
a presser plate secured to the case of the transmission,
wherein the dynamic damper is secured to the case of the transmission through the presser plate.

8. The parking lock device according to claim 6 further comprising:
a presser plate secured to the case of the transmission,
wherein the receiver is fixed to the case of the transmission by the presser plate.

9. The parking lock device according to claim 6, wherein the dynamic damper includes a base portion, an annular weight portion, and an elastic layer, the base portion includes a generally cylindrical region a flange provided at one end of the generally cylindrical region, the annular weight portion surrounds a periphery of the generally cylindrical region, and the elastic layer is provided between the base portion and the annular weight.

10. The parking lock device according to claim 9, wherein the elastic layer is constituted by an elastic material.

11. The parking lock device according to claim 9, wherein the elastic layer is provided between at least of one an outer peripheral face of the generally cylindrical region and a lateral face of the flange portion.

12. A parking lock device that is installed in a case of a transmission of a vehicle, the parking lock device comprising:
a gear including a plurality of teeth arranged in a circumferential direction of the gear, a tooth space being defined between the plurality of teeth;
a lock including a pawl to be engaged in the tooth space, the lock moveable between an engagement position and a retreat position, in the engagement position the pawl is engaged in the tooth space to lock the gear and in the retreat position the pawl is not engaged in the tooth space;
a receiver fixed to the case of the transmission, the receiver is a component separate from the case of the transmission;
a cam moveable into and out of a gap defined between the receiver and the lock, the cam holding the lock in the engagement position when having entered into the gap; and
a damper that dampens vibrations that are generated when the gear and the lock come into contact with each other, the damper provided on a vibration transmission path that transmits the generated vibrations to the case of the transmission, the vibration transmission path formed of the lock, the cam, and the receiver,
wherein the damper is a weight formed at an end of an arm portion that extends from the receiver.

13. The parking lock device according to claim 12 further comprising:
a presser plate secured to the case of the transmission,
wherein the damper is secured to the case of the transmission through the presser plate.

14. The parking lock device according to claim 12 further comprising:
a presser plate secured to the case of the transmission,
wherein the receiver is fixed to the case of the transmission by the presser plate.

* * * * *